United States Patent
Wolfstädter et al.

(10) Patent No.: US 11,975,881 B2
(45) Date of Patent: May 7, 2024

(54) CARRIER FOR THE SIMULTANEOUS MEASUREMENT OF A PLURALITY OF SEALING PARAMETERS IN A PRIMARY PACKAGING LINE FOR OPHTHALMIC LENSES

(71) Applicant: ALCON INC., Fribourg (CH)

(72) Inventors: Jens Wolfstädter, Kleinwallstadt (DE); Alfred Fischer, Niedernberg (DE); Felix Brinckmann, Rossdorf (DE); Nils Schweizer, Bad Konig (DE)

(73) Assignee: Alcon Inc., Fribourg (CH)

( * ) Notice: Subject to any disclaimer, the term of this patent is extended or adjusted under 35 U.S.C. 154(b) by 439 days.

(21) Appl. No.: 17/472,991

(22) Filed: Sep. 13, 2021

(65) Prior Publication Data
US 2022/0081143 A1 Mar. 17, 2022

Related U.S. Application Data (60) Provisional application No. 63/077,831, filed on Sep. 14, 2020.

(51) Int. Cl.
*B65B 57/00* (2006.01)
*B65B 25/00* (2006.01)
*B65B 51/10* (2006.01)
*G01N 19/00* (2006.01)
*G01N 25/00* (2006.01)

(52) U.S. Cl.
CPC ............ *B65B 57/00* (2013.01); *B65B 25/008* (2013.01); *B65B 51/10* (2013.01); *G01N 19/00* (2013.01); *G01N 25/00* (2013.01)

(58) Field of Classification Search
CPC ....... B65B 57/00; B65B 25/008; B65B 51/10; G01N 19/00; G01N 25/00
See application file for complete search history.

(56) References Cited

U.S. PATENT DOCUMENTS

| | | | |
|---|---|---|---|
| 5,623,816 A | 4/1997 | Edwards et al. | |
| 5,848,514 A | 12/1998 | Edwards et al. | |
| 2007/0157553 A1* | 7/2007 | Voss | B29C 66/114 53/329 |

FOREIGN PATENT DOCUMENTS

| | | |
|---|---|---|
| EP | 3266591 A1 | 1/2018 |
| WO | 9832587 A2 | 7/1998 |
| WO | 2004026691 A1 | 4/2004 |
| WO | 2017098357 A1 | 6/2017 |

\* cited by examiner

*Primary Examiner* — Kristina M Deherrera
*Assistant Examiner* — Jean F Morello
(74) *Attorney, Agent, or Firm* — Sheng-Hsin Hu (57) ABSTRACT

A carrier (1) for the simultaneous measurement of sealing temperature, sealing time and sealing force in a primary packaging line for ophthalmic lenses comprises a temperature sensing plate (2), a force sensing plate (3), and a supporting plate (4). Temperature sensing plate (2) is arranged atop force sensing plate (3), which is arranged atop supporting plate (4).

9 Claims, 3 Drawing Sheets

CARRIER FOR THE SIMULTANEOUS MEASUREMENT OF A PLURALITY OF SEALING PARAMETERS IN A PRIMARY PACKAGING LINE FOR OPHTHALMIC LENSES

FIELD

The present invention relates to a carrier for the simultaneous measurement of a plurality of sealing parameters in a primary packaging line for ophthalmic lenses. More specifically, the invention relates to a carrier for the simultaneous measurement of the sealing temperature, the sealing time and the sealing force of a sealing plate of a primary packaging line for packaging ophthalmic lenses.

BACKGROUND

In the automated mass manufacture of ophthalmic lenses such as contact lenses, in particular soft contact lenses (e.g. single-use soft contact lenses which are disposed of after use), a lens that has passed inspection is typically placed into the bowl of a primary packaging shell normally made of plastic (e.g. polypropylene). Thereafter, a predetermined amount of a storage liquid (e.g. saline) is dispensed into the bowl of the shell containing the lens, and a foil is placed on the top surface of the primary packaging shell. The foil is subsequently sealed to the top surface along a seal seam completely surrounding the bowl, thus forming a sealed primary package containing the lens and the storage liquid.

In a primary packaging line of an automated lens manufacturing line, a plurality of shells (e.g. five shells, but any number other than five is possible as well) are typically arranged on a carrier where the individual shells are waiting for a lens to be placed into the bowl of each individual shell. In one example of a primary packaging line of a lens manufacturing line, once a lens has been placed into each individual shell arranged on the carrier the carrier is moved along a track to a dispensing station where a predetermined amount of storage liquid is dispensed into each of the bowls. The carrier is then further moved along the track to the foil placement station where a strip of pre-cut foil is placed on top of the shells arranged on the carrier, with the foil strip extending over all shells arranged on the carrier. Thereafter, the carrier is moved to the sealing station where the foil is sealed to the top surface of each of the shells along a respective seal seam so that a strip of primary packages (in the afore-mentioned example five primary packages) is formed, with the foil connecting the individual primary packages of the strip.

Sealing of the foil along the seal seam of each individual shell is performed in the sealing station with the aid of a plurality of heated sealing plates (in the example of five shells being arranged on the carrier, five sealing plates are arranged in the sealing station). Each of the heated sealing plates has a sealing contour protruding from the sealing plate and having a sealing surface the shape of which corresponds to the shape of the seal seam. Each sealing plate is heated to a predetermined sealing temperature and is pressed onto the foil with a predetermined sealing force and for a predetermined sealing time to obtain a properly sealed primary package.

Since different types of lenses (e.g. different base curves, different diopters, etc.) are concurrently manufactured by a lens manufacturing line, a plurality of tracks are arranged in the primary packaging line, since the lenses placed into the shells arranged on the same carrier must all be of the same type (the number of tracks in the primary packaging line is at least as high as the number of different types of lenses concurrently manufactured by the lens manufacturing line).

As mentioned above, to obtain properly sealed primary packages it is vital that the sealing temperature, the sealing force and the sealing time are within predetermined tolerance ranges around a respective set sealing temperature, set sealing force and set sealing time. During maintenance of the production line, after interruption of production for a considerable period of time, in case an additional track of the packaging line is put into operation, or in case a signal indicating that a sealing parameter is outside the tolerance range has been forwarded to the packaging line control, the sealing parameters of the primary packaging line must be verified prior to resuming lens packaging, as otherwise the primary packages containing the lens and the storage liquid may not be properly sealed and cannot be distributed to customers.

Verification of the sealing parameters of the primary packaging line is a comparatively cumbersome task, since the various sealing parameters (i.e. sealing temperature, sealing force, and sealing time) of the sealing plates of each track are verified one after the other. For example, in a first verification run the sealing force of the sealing plates of a track is measured using a specific force measurement carrier, thereafter in a second verification run the sealing time of the sealing plates of the same track is measured using the force measurement carrier, and finally in a third verification run the sealing temperature of the sealing plates of the track is measured using a specific temperature measurement carrier (different from the force measurement carrier). The separate measurement runs for individually measuring the different parameters are performed to avoid that measurement of one parameter (e.g. sealing force) has an impact on or even falsifies measurement of another parameter (e.g. sealing time), so that the measurements of all sealing parameters are time-consuming. Also, it is evident that prior to measuring the sealing temperature the force measurement carrier must be replaced by the temperature measurement carrier to being able to measure the sealing temperature. This replacement of the measurement carrier requires additional action by the operator before the temperature can be measured.

It is always mandatory to verify the sealing parameters of all sealing plates of all tracks of the packaging line prior to resuming lens packaging, since even if the sealing parameters of only one sealing plate of a particular track have caused the verification, it must be made sure that after the corrective adjustment has been made by the operator all sealing plates of all tracks are within the tolerance ranges again prior to resuming lens packaging, as the operator may inadvertently have adjusted the parameters of a sealing plate other than the one that would have required the corrective adjustment. Obviously, such verification of the sealing parameters requires considerable time, and if the manufacturing line is otherwise operable this may result in that the lenses produced by the manufacturing line during the time needed for the verification must be discarded as they cannot be packaged. Evidently, this has a negative impact on the yield.

SUMMARY OF THE INVENTION

It is therefore an object of the invention to improve the verification of the sealing parameters in a primary packaging line for ophthalmic lenses, such as contact lenses, for example soft contact lenses.

To achieve this object, the present invention suggests as carrier for the simultaneous measurement of the sealing temperature, the sealing time and the sealing force of a sealing plate of a primary packaging line for packaging ophthalmic lenses, such as contact lenses, for example soft contact lenses, as it is specified in the independent claim directed to the carrier. Advantageous aspects of the carrier according to the invention are the subject of the dependent claims directed to the carrier.

In particular, the carrier according to the invention comprises
- a temperature sensing plate,
- a force sensing plate, and
- a supporting plate, wherein the temperature sensing plate, the force sensing plate and the supporting plate are arranged one above the other in a stack, with the temperature sensing plate being arranged atop the force sensing plate, and with the force sensing plate being arranged atop the supporting plate.

The temperature sensing plate comprises
- a temperature sensing plate upper surface,
- a temperature sensing plate lower surface,
- a resilient compressible temperature sensor mounted to the temperature sensing plate so as to centrally protrude above the temperature sensing plate upper surface in an uncompressed state as well as to be compressible in a direction towards the temperature sensing plate lower surface, and
- a central hub protruding downwardly below the temperature sensing plate lower surface.

The force sensing plate comprises
- first and second force sensing plate end portions, the first and second force sensing plate end portions each having an upper surface and a lower surface, the force sensing plate having an overall plate thickness,
- a flexure beam having a flexure beam upper surface and a flexure beam lower surface as well as a beam thickness which is less than the overall plate thickness, wherein the flexure beam is arranged to connect the first and second force sensing plate end portions, with the flexure beam upper surface and the upper surfaces of the first and second force sensing plate end portions together forming a force sensing plate upper surface, and
- a flex sensor for measuring the amount of flexure of the flexure beam in response to a force acting on the flexure beam.

The supporting plate comprises a supporting plate upper surface and a supporting plate lower surface.

The temperature sensing plate is arranged atop the force sensing plate with only the central hub of the temperature sensing plate being in physical contact with the flexure beam upper surface whereas a gap is formed between the temperature sensing plate lower surface and the force sensing plate upper surface.

The force sensing plate is arranged atop the supporting plate with only the lower surface of the first and second force sensing plate end portions being in physical contact with the supporting plate upper surface while a space is formed between the flexure beam lower surface and the supporting plate upper surface to allow the flexure beam to flex in response to a downward force applied to the temperature sensing plate and transmitted to the force sensing plate through the central hub of the temperature sensing plate.

In accordance with one aspect of the carrier according to the invention, the temperature sensing plate upper surface further comprises a ridge arranged in a central portion of the sensing plate upper surface and at least partially laterally surrounds the temperature sensor protruding centrally above the temperature sensing plate upper surface. The ridge has an upper surface which is the uppermost portion of the temperature sensing plate upper surface, and this upper surface of the ridge forms an abutment surface for a portion of the lower surface of a sealing plate which is laterally surrounded by a sealing contour of the sealing plate. The temperature sensing plate upper surface further comprises a recess laterally surrounding the ridge, for accommodating the sealing contour of the sealing plate.

In accordance with another aspect of the carrier according to the invention, the flexure beam of the force sensing plate is a hollow flexure beam.

According to still a further aspect of the carrier according to the invention, the temperature sensing plate is made from a thermally non-conductive material having a thermal conductivity of less than 1 Watt per meter and Kelvin (W/(m·K)).

In particular, the thermally non-conductive material is a glass-fiber reinforced plastic (GFRP), for example KV® 3 or similar, available from Brandenburger Isoliertechnik GmbH & Co. KG, DE-78629, Landau, Germany.

In accordance with yet a further aspect of the carrier according to the invention, the force sensing plate is made from stainless steel, for example 17-4 PH (also known as SAE type 630 stainless steel, AISI 630 or UN S17400), which is corrosion-resistant as well as sufficiently flexible.

According to a further aspect of the carrier according to the invention, the flex sensor comprises one or more strain gauges attached to the flexure beam lower surface.

In accordance with still a further aspect of the carrier according to the invention, the temperature sensing plate is mounted to the force sensing plate with the aid of screws and nuts made from a thermally non-conductive material. The screws extend through axially aligned through-holes provided in the hub of the temperature sensing plate and in the flexure beam of the force sensing plate. The screws have screw heads which are arranged in counterbores of the through-holes provided in the hub, and the nuts are secured against the lower surface of the flexure beam.

To achieve the object, the present invention also suggests a method for verifying whether the actual sealing temperature, the actual sealing time and the actual sealing force of a primary packaging line for packaging ophthalmic lenses, such as contact lenses, for example soft contact lenses, are within predetermined ranges of tolerances around set sealing temperature, set sealing time and set sealing force, as it is specified in the independent claim directed to a method.

In particular, the method according to the invention comprises the steps of:
- arranging a carrier according to the invention beneath a sealing plate of the primary packaging line;
- pressing the sealing plate against the temperature sensing plate of the carrier using the actual sealing parameters of the primary packaging line;
- simultaneously measuring
  - the actual temperature of the sealing plate with the aid of the temperature sensor arranged in the temperature sensing plate;
  - the actual sealing time with the aid of the force sensor of the force sensing plate;
  - the actual sealing force applied by the sealing plate with the aid of the force sensor of the force sensing plate; and
- verifying whether the measured actual sealing temperature, the measured actual sealing time and the measured actual sealing force are within the predetermined ranges of tolerances around the set sealing temperature.

As regards the carrier, the carrier according to the invention allows to simultaneously measure the (actual) sealing temperature, the (actual) sealing time and the (actual) sealing force of a sealing plate of a primary packaging line for ophthalmic lenses, such as contact lenses, for example soft contact lenses. The simultaneous measurement of these three sealing parameters is possible due to the specific construction of the carrier according to the invention. The resilient compressible temperature sensor which in its uncompressed state projects above the temperature sensing plate upper surface makes sure that once the sealing plate is pressed against the temperature sensing plate upper surface, the temperature sensor is getting compressed and thus makes a very good and reliable thermal contact with the sealing plate so that a reliable measurement of the sealing temperature is possible. For example, the temperature sensor may be embodied as a conventional thermocouple (e.g. type K) or may be embodied as a conventional measuring resistor (e.g. Pt-100), both being readily available on the market.

The sealing force exerted by the sealing plate on the temperature sensing plate is transferred to the flexure beam of the force sensing plate only by the central hub of the temperature sensing plate, since only the central hub is in physical contact with the flexure beam. The lower surface of the temperature sensing plate is otherwise not in contact with the upper surface of the force sensing plate. Instead, a gap is formed between the temperature sensing plate lower surface and the force sensing plate upper surface, except for the portion where the central hub is in physical contact with the upper surface of the flexure beam. This gap (an air gap) serves two functions: Firstly, it allows the sealing force exerted by the sealing plate on the temperature sensing plate to be transferred only to a central portion of the flexure beam where the flexure beam flexes the most in response to the force transferred to the flexure beam. Secondly, the air in the gap acts as a thermally insulating material. The purpose of the thermal insulation is to avoid that the measurement of the sealing force or the sealing time is impacted or even falsified by a significant heat transfer from the temperature sensing plate to the force sensing plate. This is why the temperature sensing plate is preferably made from a thermally non-conductive material, i.e. a material having a thermal conductivity which is lower than 1 Watt per meter and Kelvin (W/(m·K)), so that the temperature sensing plate forms a heat shield for the force sensing plate. For example, the temperature sensing plate may be made from a material selected from a glass-fiber reinforced plastic (GFRP), for example the above-mentioned KV® 3, available from Brandenburger Isoliertechnik GmbH & Co. KG, DE-78629, Landau, Germany, or a similar material. Such materials are thermally insulating on one hand while being corrosion-resistant on the other hand which is important as the environment is the manufacturing environment of a medical article (an ophthalmic lens). As mentioned, the force of the sealing plate is transferred to the flexure beam of force sensing plate only by the central hub. The force sensing plate may have a thickness less than 50% of the overall plate thickness of the force sensing plate, and may preferably be made from stainless steel, for example the above-mentioned stainless steel 17-4 PH (also known as SAE type 630 stainless steel, AISI 630 or UN S17400) or a similar stainless steel, which is corrosion-resistant as well as sufficiently flexible. Such materials are corrosion-resistant on one hand and are sufficiently flexible on the other hand to allow the flexure beam to sufficiently flex in response to the force transferred to the flexure beam by the central hub so that the flexion of the flexure beam can be reliably measured. Also, the materials should be able to allow the flexure beam to quickly restore its original (unbent) shape once the sealing force is no longer applied and consequently no force is transferred anymore.

Flexion of the flexure beam is measured with the aid of a suitable sensor which—by way of example—may comprise one or more strain gauges attached to a lateral surface of the flexure beam. However, other sensors measuring the flexion of the flexure beam are conceivable as well (e.g. sensors optically detecting the flexion). The flexion of the flexure beam is representative of the sealing force applied by the sealing plate and transferred to the flexure beam through the central hub, and its measurement—due to the thermal insulation of the force sensing plate and the temperature sensing plate—is not impacted or falsified by a transfer of heat to the force sensing plate.

The sealing time (i.e. the duration) is measured with the aid of the force sensing plate, too. The sealing time may be determined to be the time interval that starts when the sealing force applied by the sealing plate increases above a predetermined threshold force which may be a force selected from the range of 20% to 40% of the set sealing force (for example, for a set sealing force of about 350 N (Newtons) the predetermined threshold force may be 100 N). The time interval ends when the sealing force applied by the sealing plate decreases below the predetermined threshold force again (in the afore-mentioned example below 100 N).

Finally, the supporting plate has a supporting plate upper surface which is in contact with the lower surfaces of the first and second end portions of the force sensing plate which are connected by the flexure beam, whereas a space is formed between the supporting plate upper surface and the flexure beam lower surface allowing the flexure beam to flex downwardly in response to the force transferred to the flexure beam by the central hub. The supporting plate is comparatively voluminous, stiff and massive relative to each of the temperature sensing plate and the force sensing plate, and may be made from an aluminum alloy, e.g. an aluminum alloy sold under the name G.AL® C250, which is an aluminum alloy according to EN AW 5083 [AlMg4.5Mn0.7-3.3547], available from Gleich Aluminium GmbH, DE-24568 Kaltenkirchen, Germany, or from a similar material. Any force transfer from the force sensing plate to the supporting plate may occur solely through the first and second end portions of the force sensing plate, and does not result in a deformation of the (massive) supporting plate. For example, the first and second end portions of the force sensing plate may be mounted to the supporting plate with the aid of screws.

The carrier according to the invention allows for a quick, reliable and simultaneous measurement of the sealing temperature, the sealing force and the sealing time in a single measurement run. Of course, a plurality of carriers according to the invention corresponding in number to the number of sealing plates arranged on one track of the packaging line can be used to simultaneously measure the actual sealing parameters (sealing temperature, sealing force and sealing time) of all sealing plates of one track of a packaging line and to verify whether the sealing parameters of all sealing plates of this track are within the predetermined tolerance range about the set sealing temperature, the set sealing force and the set sealing time of the primary packaging line. This greatly reduces the time required for the verification of the packaging line (if necessary) and may thus increase the yield of the lens manufacturing line.

According to one aspect, the temperature sensing plate upper surface may further comprise a ridge which is arranged in a central portion of the temperature sensing plate upper surface and at least partially laterally surrounds the (resilient compressible) temperature sensor that protrudes centrally above the temperature plate upper surface. For example, the ridge may be a ridge having a closed contour (e.g. a ridge having the shape of a closed circle), or may comprise only two or more segments that only partially surround the temperature sensor. The upper surface of the ridge is the uppermost portion of the temperature sensing plate upper surface and forms an abutment surface for a portion of the lower surface of the sealing plate, this portion of the lower surface of the sealing plate being surrounded by a sealing contour that protrudes from the lower surface of the sealing plate. The temperature sensing plate upper surface may further comprise a recess laterally surrounding the ridge, and this recess is configured for accommodating the sealing contour of the sealing plate. Accordingly, once the sealing plate is moved towards the temperature sensing plate of the carrier for measurement of the sealing parameters, that portion of the lower surface of the sealing plate which is surrounded by the sealing contour first comes into contact with the resilient compressible temperature sensor projecting above the temperature sensing plate upper surface. Upon continuing to move the sealing plate towards the temperature sensing plate of the carrier, the temperature sensor is compressed until that portion of the lower surface of the sealing plate laterally surrounded by the sealing contour comes to rest on the upper surface of the ridge. The sealing contour of the sealing plate protrudes into the recess laterally surrounding the ridge, and the depth of this recess is chosen such that a sealing surface of the sealing contour of the sealing plate is not in contact with the temperature sensing plate upper surface (i.e. the 'bottom' of the recess). Thus, the portion of the lower surface of the sealing plate which is laterally surrounded by the sealing contour abuts against the upper surface of the ridge and rests on the upper surface on the ridge, and this portion of the lower surface of the sealing plate it the only portion of the sealing plate which is in physical contact with the temperature sensing plate upper surface. Accordingly, the sealing plate as a whole only rests on this upper surface of the ridge of the temperature sensing plate. As this ridge is arranged in a central portion of the temperature sensing plate, the sealing force is transferred to a central portion of the temperature sensing plate and is further transferred to the flexure beam of the force sensing plate only through the central hub, so that the maximum possible flexure of the flexure beam is achieved. As has also been mentioned above already, the flexure beam may be a hollow flexure beam (i.e. the flexure beam has hollow cross-sectional profile) which allows the degree of flexure to be even higher when compared with a flexure beam made of solid material.

The temperature sensing plate may be mounted to the force sensing plate with the aid of screws and nuts which are made from a thermally non-conductive material. For that purpose the screws extend through axially aligned through-holes provided in the hub of the temperature sensing plate and in the flexure beam of the force sensing plate. The screws may have screw heads which are arranged countersunk in counterbores of the through-holes provided in the hub, and the nuts are secured against the lower surface of the flexure beam. There is sufficient space between the upper surface of the supporting plate and the lower surface of the flexure beam since the flexure beam must be allowed to flex, and so it is easily possible to secure the nuts against the lower surface of the flexure beam, thus reliably connecting the temperature sensing plate and the force sensing plate. The force sensing plate (i.e. the end portions thereof) may be fixedly mounted to the supporting plate with the aid of screws.

The advantages of the method according to the invention correspond to those discussed in connection with the various aspects of the carrier according to the invention, and are therefore not reiterated here. The most important advantage is that it is possible to simultaneously verify whether the actual sealing temperature, the actual sealing time and the actual sealing force of a sealing plate in primary packaging line for ophthalmic lenses, such as contact lenses, for example soft contact lenses, are within the predetermined tolerance ranges around the set sealing temperature, the set sealing time and the set sealing force, thus saving a lot of time during the verification procedure thereby increasing the yield of the lens manufacturing line.

BRIEF DESCRIPTION OF THE DRAWINGS

Further advantageous aspects of the invention will become apparent from the following description of embodiments of the invention with the aid of the drawings in which.

DESCRIPTION OF EMBODIMENTS

In the following, an embodiment of the carrier according to the invention is described in more detail with the aid of FIG. 1, FIG. 2, FIG. 3 and FIG. 4. The reference signs used in the following description are not shown in all of the afore-mentioned drawings, in this regard it is referred to the respective drawing in which the reference sign is shown.

Figure 1:
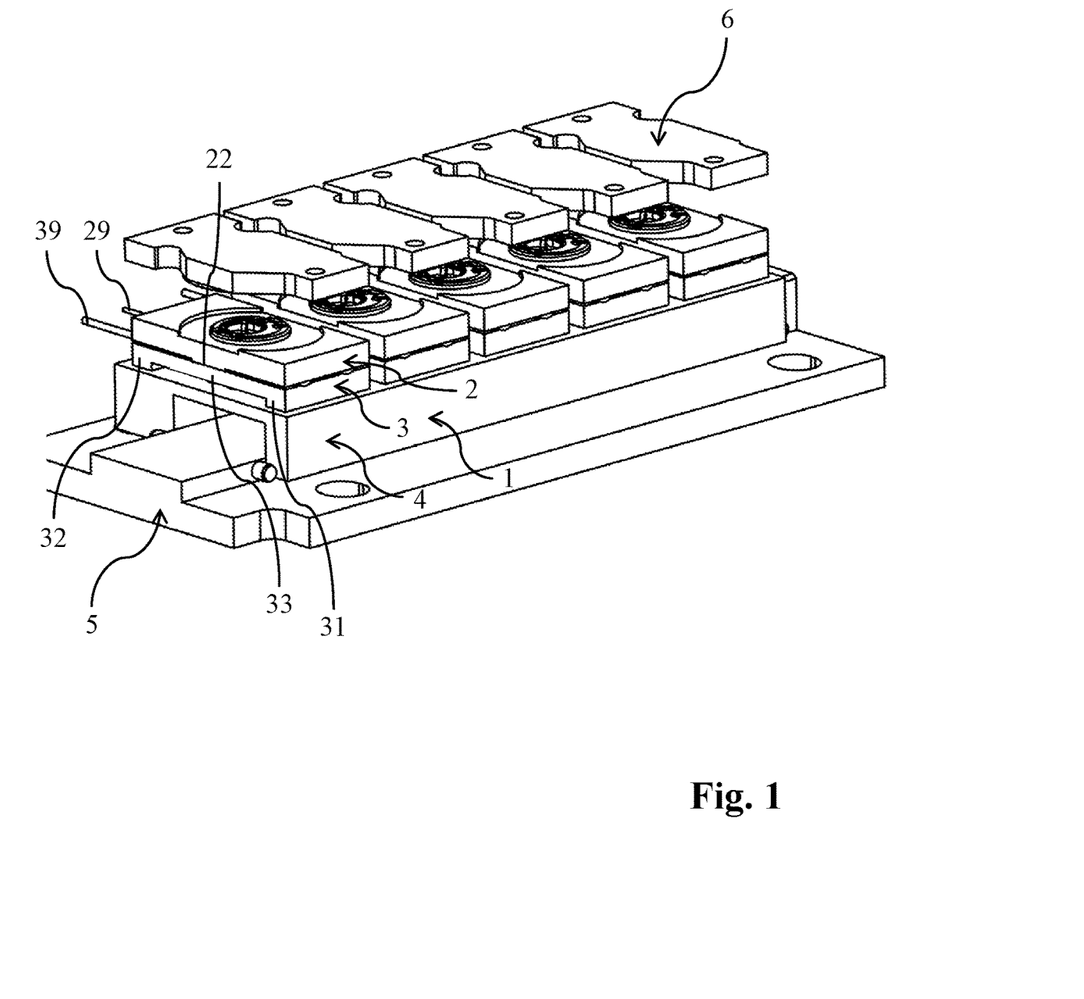
FIG. 1 shows a perspective view of an embodiment of a carrier according to the invention.

In FIG. 1 a perspective view of an embodiment of a carrier 1 according to the invention is shown. Carrier 1 comprises a temperature sensing plate 2, a force sensing plate 3 and a supporting plate 4 which are arranged one above the other in a stack. Temperature sensing plate 2 is arranged atop force sensing plate 3. The embodiment shown in FIG. 1 comprises five temperature sensing plates 2 and force sensing plates 3 which are arranged on a common supporting plate 4. However, alternatively each carrier 1 may comprise an individual supporting plate 4 instead. Carrier 1 is arranged on a base plate 5 which does not form part of the carrier 1 but serves to support the carrier 1 (in the manner of an anvil) during the sealing action or the verification action, i.e. at the time the sealing plate 6 is pressed against the temperature sensing plate 2 from above. Also visible in FIG. 1 are the leads 29 and 39 transmitting the signals from the sensors of the temperature sensing plate 2 and the force sensing plate 3 to a control/evaluation unit (not shown) to determine whether the sealing parameters (sealing temperature, sealing time and sealing force) are within predetermined tolerance ranges around the set sealing temperature, set sealing time and set sealing force.

Figure 2:
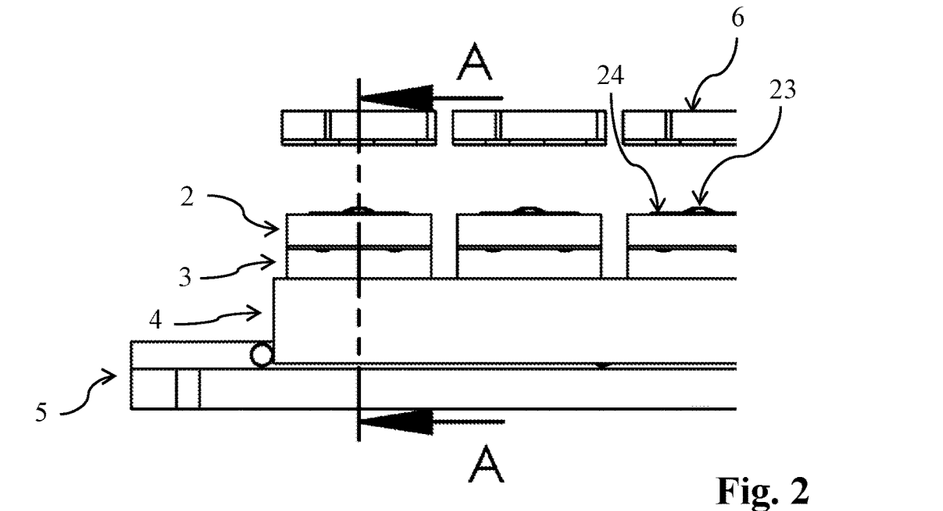
FIG. 2 shows a partial side view of the carrier shown in FIG. 1.
Figure 3:
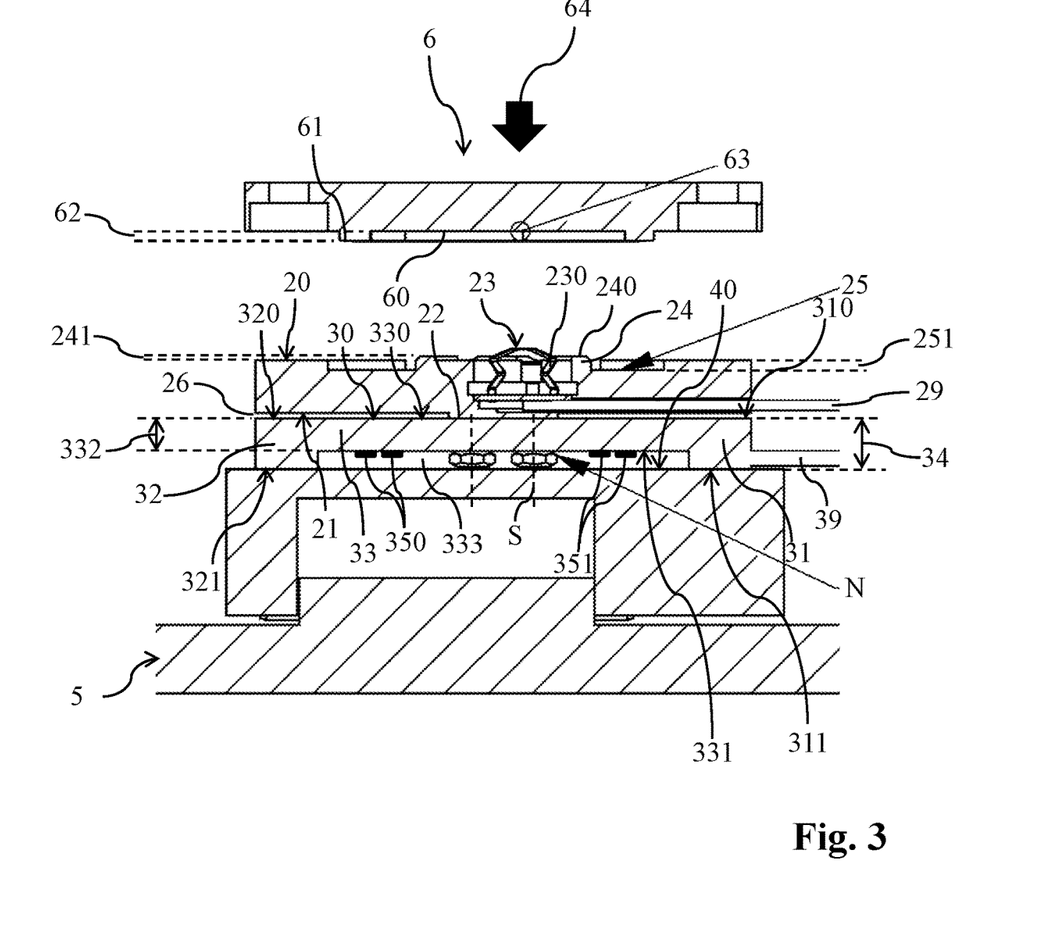
FIG. 3 shows a sectional view of the carrier along lines A-A of FIG. 2.

As can be seen better in FIG. 3, temperature sensing plate 2 comprises a temperature sensing plate upper surface 20 and a temperature sensing plate lower surface 21 as well as a central hub 22 (also shown in FIG. 1) that protrudes downwardly below temperature sensing plate lower surface 21. Temperature sensing plate 2 further comprises a resilient compressible temperature sensor 23 that protrudes above the temperature sensing plate upper surface 20, as can be seen in FIG. 2 and FIG. 3. For that purpose, the temperature sensor 23 comprises resilient legs 230 which are mounted to the temperature sensing plate 2 and connected to the leads 29. For example, in the embodiment shown four such legs 230 may be provided (with only two legs 230 being visible in FIG. 3). In FIG. 3, these legs 230 are shown as having a V-shape (viewed in horizontal direction) in order to illustrate that the temperatures sensor 23 is compressible in a direction towards the temperature sensor plate lower surface 21. This is discussed in more detail below. The temperature sensor may comprise a thermocouple type K, or may be embodied as a measuring resistor, for example a Pt-100 measuring resistor. The mode of operation of such temperature sensors is well-known so that it does not need to be discussed.

Temperature sensing plate upper surface 20 further comprises a ridge 24 arranged in a central portion of sensing plate upper surface 20. The ridge 24 can either be a circumferentially running completely closed ridge (e.g. of circular or any other shape) or may comprise only portions of such completely closed contour. Ridge 24 has an upper surface 240 that forms the uppermost portion of the temperature sensing plate upper surface 20, as is indicated by the small distance 241 (represented by the dashed lines at the left hand side in FIG. 3) illustrating that the level of the upper surface 240 of ridge 24 is arranged slightly above the rest of temperature sensing plate upper surface 20. Temperature sensing plate upper surface 20 further comprises a recess 25 laterally surrounding ridge 24 which can be seen best in the perspective view of FIG. 4. Recess 25 has a depth 251 (represented by the dashed lines at the right hand side of FIG. 3).

Upper surface 240 of ridge 24 forms an abutment surface for a portion 60 of the lower surface of sealing plate 6 which is laterally surrounded by a sealing contour 61 of the sealing plate 6. Sealing contour 61 of sealing plate 6 protrudes from the lower surface of sealing plate 6 and has a protrusion height 62 (indicated by the dashed lines on the left hand side in FIG. 3). Recess 25 of temperature sensing plate 2 serves to accommodate the sealing contour 61 of the sealing plate 6 once the sealing plate 6 is pressed onto temperature sensing plate 2. When sealing plate 6 is pressed onto temperature sensing plate 2 to perform a verification measurement, the portion 60 of the lower surface of sealing plate 6 which is surrounded by the sealing contour 61 abuts against the upper surface 240 of ridge 24 and rests thereon. The depth 251 of recess 25 is selected such that the sum of the small distance 241 by which the ridge 24 projects above the rest of the temperature sensing plate upper surface 20 and the depth 251 of the recess 25 is just a little bit larger than the protrusion height 62 of the sealing contour 61. As a consequence, once the portion 60 of the lower surface of sealing plate 6 rests on (abuts against) the upper surface 240 of ridge 24, the sealing contour 61 extends into the recess 25 but does not abut against the bottom surface of the recess 25. The sealing plate 6 thus rests only on the ridge 24 arranged in the central portion of temperature sensing plate upper surface 20, and any sealing force 64 (represented by the arrow above sealing plate 6 of FIG. 3) applied by the sealing plate 6 is transferred solely to the ridge 24 (i.e. to a central portion of temperature sensing plate 2).

Force sensing plate 3 comprises a first force sensing plate end portion 31 and a second force sensing plate end portion 32 as well as a flexure beam 33 connecting the first and second force sensing plate end portions 31, 32. First force sensing plate end portion 31 comprises an upper surface 310 and a lower surface 311, and second force sensing plate end portion 32 also comprises an upper surface 320 and a lower surface 321. Flexure beam 33 comprises a flexure beam upper surface 330 and a flexure beam lower surface 331, and has a flexure beam thickness 332 (indicated by the dashed lines at the left hand side of FIG. 3) which is less than an overall plate thickness 34 of force sensing plate 3 (indicated by the dashed lines at the right hand side of FIG. 3). For example, the thickness of flexure beam 33 may be 50% of the overall plate thickness of force sensing plate 3. Flexure beam 33 may have a hollow cross-sectional profile to increase its flexibility. Upper surfaces 310, 320 of first end second force sensing plate end portions 31, 32 and upper surface 330 of flexure beam 33 together form a force sensor plate upper surface 30. Force sensing plate 3 further comprises a force sensor 35 (FIG. 4) which—as shown in FIG. 3—may comprise two pairs of strain gauges 350, 351, for example strain gauges SS1712DB available from Toledo Transducers, Inc., Holland, Ohio, United States of America 43528, which may be attached to flexure beam lower surface 331. The mode of operation of strain gauges is well-known so that it does not have to be discussed.

Figure 4:
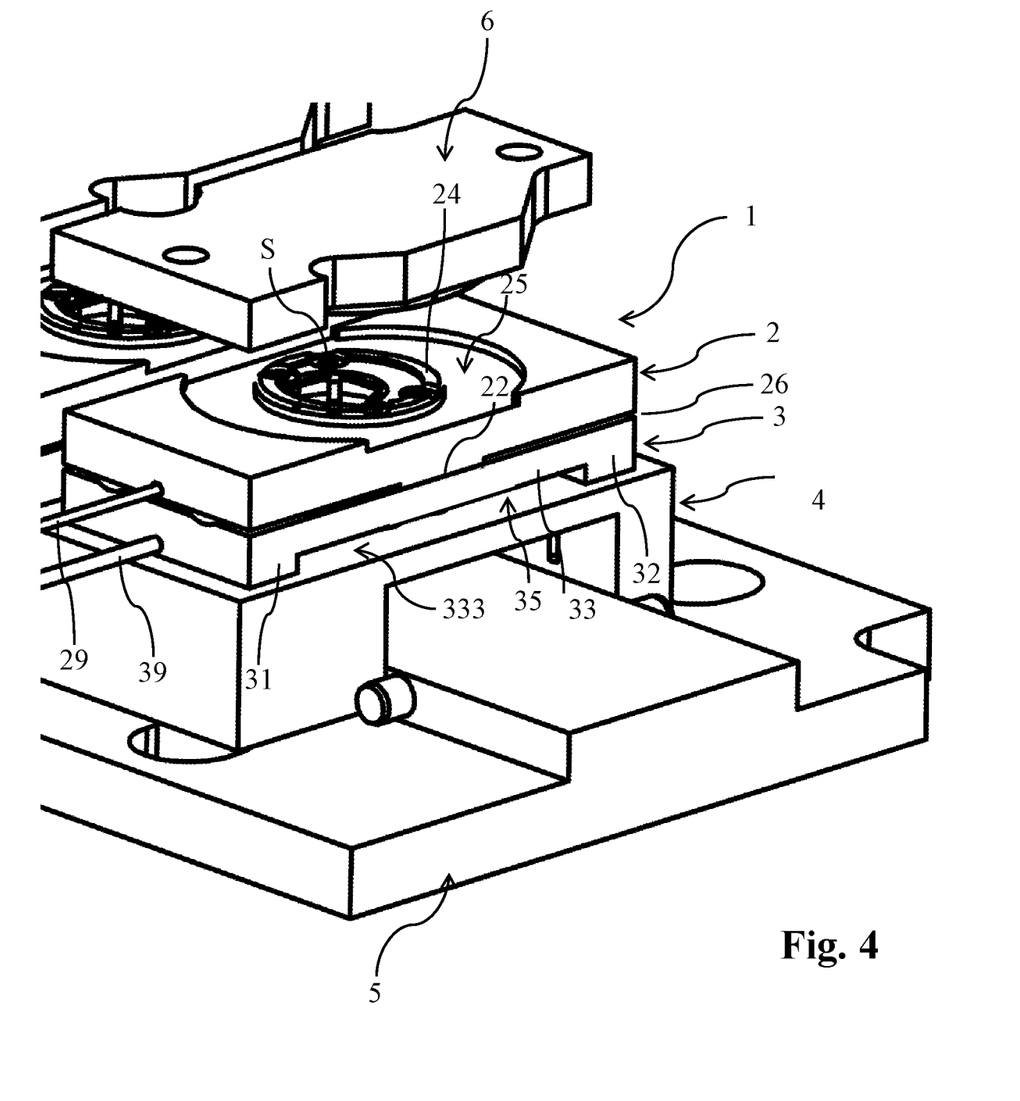
FIG. 4 shows another perspective view of the carrier (enlarged).

Temperature sensing plate 2 may be mounted to force sensing plate 3 with the aid of screws and nuts, for example. For that purpose, axially aligned through-holes may be provided that extend through the temperature sensing plate 2, and in particular through the central hub 22 thereof, and through the flexure beam 33 of force sensing plate 3 as well. The screws are indicated in FIG. 3 by the dashed lines S (the screws S are also indicated in FIG. 4), and the nuts N are secured against the flexure beam lower surface 331 (as can be seen in FIG. 3). Nuts N are shown in FIG. 3 exaggeratedly large for better illustration. The heads of the screws S can be arranged countersunk in counterbores of the through-holes in the hub 22, as can be seen in FIG. 4.

When the temperature sensing plate 2 is mounted to the force sensing plate 3, only the central hub 22 of the temperature sensing plate 2 is in physical contact with the force sensing plate upper surface 32, whereas a gap 26 is (see FIG. 3) is formed between the temperature sensing plate lower surface 21 and the force sensing plate upper surface 30. Accordingly, any downward force (sealing force) applied to the temperature sensing plate 2 is transferred to the force sensing plate 3 only through the central hub 22, and in particular this downward force is transferred to the flexure beam 33 of force sensing plate 3. The gap 26 is filled with air. Also, temperature sensing plate 2 is made from a thermally non-conductive material such as a glass-fiber reinforced plastic (GFRP), for example the above-mentioned KV® 3, available from Brandenburger Isoliertechnik GmbH & Co. KG, DE-78629, Landau, Germany, or a similar material, so that both the temperature sensing plate 2 as well as the air gap 26 serve to thermally insulate the force sensing plate 3 from heat being transferred to the force sensing plate 3. Thus, measurement of the sealing force and the sealing time with the aid of the force sensing plate 3 and the force sensor 35 is not negatively impacted or falsified by the high temperature of the sealing plate 6 which may amount to more than 200° C. (Celsius). Force sensing plate 3 may be made from stainless steel, for example the above-mentioned stainless steel 17-4 PH (also known as SAE type 630 stainless steel, AISI 630 or UN S17400) or a similar material, which is corrosion-resistant as well as sufficiently flexible, or a similar material which is sufficiently flexible and resistant to corrosion.

The force sensing plate 3 with the temperature sensing plate 2 arranged thereon and mounted thereto are arranged on a rigid and massive supporting plate 4. For that purpose the lower surfaces 311, 321 of the first and second force sensing plate end portions 31, 32 are arranged on the supporting plate upper surface 40 and may be mounted to the supporting plate 4 with the aid of screws (not visible). As the flexure beam thickness 332 is smaller than the overall plate thickness of force sensing plate 3, a space 333 is formed between flexure beam lower surface 331 and supporting plate upper surface 40. In FIG. 1-FIG. 4, the supporting plate 4 in turn is arranged on a base plate 5, however, base plate 5 is not part of the carrier 1.

Verification of the sealing parameters, i.e. sealing temperature, sealing force and sealing time may be performed as follows. Carrier 1 is arranged underneath a sealing plate 6 in a sealing station of a primary packaging line for ophthalmic lenses. The sealing plate 6 is then lowered, and the temperature sensor 23 is the first component of the temperature sensing plate 2 to make contact with the sealing plate 6. This point of contact 63 (see FIG. 3) is located in a portion 60 of the lower surface of sealing plate 6 which is surrounded by the sealing contour 61 that protrudes from the lower surface of the sealing plate 6.

Sealing plate 6 is then further lowered until the portion 60 of the lower surface of sealing plate 6 abuts against the upper surface 240 of ridge 24 and comes to rest thereon (alternatively, carrier 1 may be lifted and sealing plate 6 may be fixedly arranged and need not be lowered). During further lowering the sealing plate 6, the temperature sensor 23 is resiliently compressed. When the portion 60 of the sealing plate rests on the upper surface 240 of ridge 24 of temperature sensing plate 2, the sealing contour 61 of sealing plate 6 extends into the recess 25 surrounding ridge 24, however, without contacting the bottom of the recess 25. When the sealing force 64 is applied to the sealing plate 6, this sealing force 64 is transferred to the ridge 24 only, as the ridge 24 is the only portion of temperature sensing plate 2 which is in physical contact with sealing plate 6. In this position, the temperature sensor 23 is in very good physical and thermal contact with the portion 60 of the sealing plate 6, thus allowing for a reliable measurement of the sealing temperature of the sealing plate 6.

As is explained above already, the sealing force 64 applied to the sealing plate 6 is transferred to the ridge 24 which is arranged in a central portion of temperature sensing plate 2. This force is then further transferred to the force sensing plate 3 through the central hub 22 of temperature sensing plate 2 that protrudes downwardly beyond the lower surface 21 of temperature sensing plate 2. In particular, the force is transferred by the central hub 22 to the flexure beam 33 of force sensing plate 3. Due to the force transferred to flexure beam 33, flexure beam 33 flexes (bends), and the flexion (bending) of flexure beam 33 results in a corresponding signal being generated by the strain gauges 350 and 351, this signal being representative of the sealing force 64 applied.

The sealing time is determined to be the time interval that starts when the sealing force applied by the sealing plate 6 increases above a predetermined threshold force which may be a predetermined force selected from the range of 20% to 40% of the set sealing force (for example, for a set sealing force of about 350 N (Newtons) the predetermined threshold force may be 100 N). The time interval ends when the sealing force applied by the sealing plate decreases below the predetermined threshold force again (in the afore-mentioned example below 100 N).

It is thus possible to simultaneously measure the sealing temperature, the sealing force and the sealing time (i.e. the duration) in a single measurement run. This greatly reduces the time required for the verification of the packaging line (if necessary) and may thus increase the yield of the lens manufacturing line.

While various aspects of the invention have been described with the aid of the drawings, various modifications and alternatives are conceivable without departing from the teaching underlying the invention. Therefore, the invention is not intended to be limited to the various aspects described herein, but rather is defined by the scope of the appended claims.

The invention claimed is:

1. A carrier (1) for the simultaneous measurement of the sealing temperature, the sealing time and the sealing force of a sealing plate of a primary packaging line for packaging ophthalmic lenses, the carrier comprising: a temperature sensing plate (2), a force sensing plate (3), and a supporting plate (4), wherein the temperature sensing plate (2), the force sensing plate (3) and the supporting plate (4) are arranged one above the other in a stack, with the temperature sensing plate (2) being arranged atop the force sensing plate (3), and with the force sensing plate (3) being arranged atop the supporting plate (4); wherein the temperature sensing plate (2) comprises a temperature sensing plate upper surface (20), a temperature sensing plate lower surface (21), a resilient compressible temperature sensor (23) mounted to the temperature sensing plate so as to centrally protrude above the temperature sensing plate upper surface (20) in an uncompressed state as well as to be compressible in a direction towards the temperature sensing plate lower surface (21), and a central hub (22) protruding downwardly below the temperature sensing plate lower surface (21); wherein the force sensing plate (3) comprises first and second force sensing plate end portions (31, 32), the first and second force sensing plate end portions (31, 32) each having an upper surface (310, 320) and a lower surface (311, 321), the force sensing plate (3) having an overall plate thickness (34), a flexure beam (33) having a flexure beam upper surface (330) and a flexure beam lower surface (331) as well as a beam thickness (332) which is less than the overall plate thickness (34), wherein the flexure beam (33) is arranged to connect the first and second force sensing plate end portions (31, 32), with the flexure beam upper surface (330) and the upper surfaces (310, 320) of the first and second force sensing plate end portions (31, 32) together forming a force sensing plate upper surface (30), and a flex sensor (35) for measuring the amount of flexure of the flexure beam (33) in response to a force acting on the flexure beam (33); wherein the supporting plate (4) comprises a supporting plate upper surface (40); and a supporting plate lower surface; wherein the temperature sensing plate (2) is arranged atop the force sensing plate (3) with only the central hub (22) of the temperature sensing plate (2) being in physical contact with the flexure beam upper surface (30) whereas a gap (26) is formed between the temperature sensing plate lower surface (21) and the force sensing plate upper surface (30); and wherein the force sensing plate (3) is arranged atop the supporting plate (4) with only the lower surface (310, 320) of the first and second force sensing plate end portions (31, 32) being in physical contact with the supporting plate upper surface (40) while a space (333) is formed between the flexure beam lower surface (331) and the supporting plate upper surface (40) to allow the flexure beam (33) to flex in response to a downward force (64) applied to the temperature sensing plate (6) and transmitted to the force sensing plate (2) through the central hub (22) of the temperature sensing plate (2).

2. The carrier according to claim 1, wherein the temperature sensing plate upper surface (20) further comprises a ridge (24) arranged in a central portion of the sensing plate upper surface (20) and at least partially laterally surrounds the temperature sensor (23) protruding centrally above the temperature sensing plate upper surface (20), the ridge (24) having an upper surface (240) being the uppermost portion of the temperature sensing plate upper surface (20) and forming an abutment surface for a portion (60) of the lower surface of a sealing plate (6) which is laterally surrounded by a sealing contour (61) of the sealing plate (6), and wherein the temperature sensing plate upper surface (20) further comprises a recess (25) laterally surrounding the ridge (24), for accommodating the sealing contour (61) of the sealing plate (6).

3. The carrier according to claim 1, wherein the flexure beam (33) of the force sensing plate (3) is a hollow flexure beam.

4. The carrier according to claim 1, wherein the temperature sensing plate (2) is made from a thermally non-conductive material having a thermal conductivity of less than 1 Watt per meter and Kelvin (W/m·Math·K).

5. The carrier according to claim 4, wherein the thermally non-conductive material is a glass-fiber reinforced plastic.

6. The carrier according to claim 1, wherein the force sensing plate (3) is made from stainless steel.

7. The carrier according to claim 1, wherein the flex sensor (35) comprises one or more strain gauges (350, 351) attached to the flexure beam lower surface (331).

8. The carrier according to claim 1, wherein the temperature sensing plate (2) is mounted to the force sensing plate (3) with the aid of screws (S) and nuts (N) made from a thermally non-conductive material, the screws extending through axially aligned through-holes provided in the hub (22) of the temperature sensing plate (2) and in the flexure beam (33) of the force sensing plate (3), the screws (S) having screw heads being arranged in counterbores of the through-holes provided in the hub (22) and the nuts (N) being secured against the lower surface of the flexure beam (33).

9. A method for verifying whether the actual sealing temperature, the actual sealing time and the actual sealing force of a sealing plate of a primary packaging line for packaging ophthalmic lenses, are within predetermined ranges of tolerances around set sealing temperature, the set sealing time and the set sealing force, the method comprising the steps of: arranging a carrier (1) according to any one of claims 1 to 8 beneath a sealing plate (6) of the primary packaging line; pressing the sealing plate (6) against the temperature sensing plate (2) of the carrier using the actual sealing parameters of the primary packaging line; simultaneously measuring: the actual temperature of the sealing plate (6) with the aid of the temperature sensor (23) arranged in the temperature sensing plate (2); the actual sealing time with the aid of the force sensor (35) of the temperature sensing plate (3); the actual sealing force applied by the sealing plate (6) with the aid of the force sensor (35) of the force sensing plate (3); and verifying whether the measured actual sealing temperature, the measured actual sealing time and the measured actual sealing force are within the predetermined ranges of tolerances around the set sealing temperature, the set sealing time and the set sealing force.

* * * * *